United States Patent
Morris

[11] Patent Number: 5,856,995
[45] Date of Patent: Jan. 5, 1999

[54] RING LASER GYROSCOPE WITH ION FLUX TRAP ELECTRODE

[75] Inventor: Robert Craig Morris, Flanders, N.J.

[73] Assignee: AlliedSignal Inc.

[21] Appl. No.: 897,960

[22] Filed: Jul. 21, 1997

[51] Int. Cl.[6] .................................................. H01S 3/097
[52] U.S. Cl. ................................................ 372/87; 372/94
[58] Field of Search .................................. 372/87, 94, 109

[56] References Cited

U.S. PATENT DOCUMENTS

| | | |
|---|---|---|
| 4,672,624 | 6/1987 | Ford ........................................... 372/87 |
| 5,098,189 | 3/1992 | vonBieren . |
| 5,220,404 | 6/1993 | Martin ........................................ 372/87 |
| 5,432,604 | 7/1995 | Canfield et al. . |

Primary Examiner—Rodney Bovernick
Assistant Examiner—Robert E. Wise
Attorney, Agent, or Firm—Verne E. Kreger, Jr.

[57] ABSTRACT

A Ring Laser Gyroscope, constructed on a low thermal expansion, lithium containing, glass-ceramic frame, with a negatively charged trap electrode applied directly to the frame surface near the cathode for the purpose of intercepting mobile positive ions transported under the influence of the anode to cathode electric field during laser operation.

15 Claims, 2 Drawing Sheets

RING LASER GYROSCOPE WITH ION FLUX TRAP ELECTRODE

BACKGROUND OF THE INVENTION

This invention relates generally to rotational sensors and particularly to ring laser gyroscopes with improved reliability and more particularly to an apparatus and method for decreasing or preventing the degradation of the cathode vacuum seal caused by electromigration of mobile positive ions under the influence of the anode to cathode electric field during laser operation.

A ring laser gyroscope is an instrument which employs the Sagnac effect to measure rotation rate. The Sagnac effect results in a phase difference between two counterpropagating ring laser beams when the ring laser mirror assembly experiences solid body rotation. The Sagnac effect phase difference is proportional to the applied rotation rate and can be measured interferometrically to great precision, providing a sensitive measure of rotation. Electrically pumped helium-neon lasers are typically used for gyroscope applications. The gyroscopic ring laser resonant cavity is defined by three or more mirrors which direct light in a closed path. It is desirable for stable single mode laser operation that the total optical path length of the closed path resonant cavity be held constant to within a small fraction of the laser wavelength. Since the instrument will generally be utilized in a variable temperature environment, the frame of the ring laser is preferably made from a low thermal expansion material. The frame material must also withstand the high voltage needed to energize the laser plasma and must resist also withstand the high voltage needed to energize the laser plasma and must resist the diffusion of laser gas out of the sealed laser assembly. Lithium-aluminum silicate based glass-ceramic materials, such as Zerodur, possess all of the necessary properties and are the preferred materials of construction for ring laser gyroscope frames. One of the few disadvantages of lithium aluminum silicate glass ceramics is that they tend to have ionic conductivity values larger than many other nominally dielectric materials. This ionic conduction property can cause a reduction in gyro life and reliability at operating temperatures of 40 degrees Celsius and above.

In a typical method of construction, a ring laser gyroscope is built from a block or frame of lithium-aluminum silicate glass-ceramic which has been carefully machined and finished to provide three or more hollow cylindrical laser bores which define the plasma chamber and form the laser resonator closed path, three or more corner surfaces to receive the laser mirrors, and two or more additional openings to the surface of the frame. These additional openings are interconnected with the plasma chamber and receive the anode and cathode electrodes needed to energize the laser plasma in the bores. In this method of construction the anode and cathode electrodes are attached to the outer surface of the frame over the appropriate openings using a cold formed or fused indium vacuum seal. The anode and cathode electrodes are typically made from metals with thermal expansion coefficients greater than that of the lithium-aluminum silicate glass-ceramic frame. Indium metal is generally chosen for the vacuum seal because of it's unique ability to adhere to the dissimilar ceramics and metal joined parts. Indium metal also deforms plastically in response to differential thermal expansion motions of the joined parts without losing vacuum tightness and without applying large traction forces to the laser frame. It is important for the reliability of the instrument that the indium vacuum seal be completely impervious to the passage of laser gases out of the plasma chamber and also impervious to the passage of atmospheric gases into the chamber. The indium seal must also be mechanically sound and free of voids in order to withstand repeated thermally induced deformations during the life of the instrument.

The inventor has observed the indium seals under the cathode electrodes chemically and mechanically degraded after long periods of laser operation at elevated temperatures. Evidence of this degradation can be observed visually as a change in the appearance of the interface between the indium metal and the glass-ceramic frame. It can also be measured directly as a reduction in the force required to detach the cathode from the frame. Also the propensity of the cathode seal to leak as a result of thermal cycling is increased as a result of long exposure to a combination of high temperature and high voltage.

When the indium portions of such degraded or failed seals are examined by the methods of surface science and chemical analysis, significant amounts of lithium are found in the indium in the region adjacent to the laser frame. It is evident from the patent and technical literature sources cited that this lithium has been transported by ionic conduction as $Li^+$ through the volume or along the surface of the laser frame and deposited electrolytically on the cathode indium seal. There is reason to believe that electromigration of other positive ions including $H^+$ or $H_3O^+$ (hydronium) may also contribute to cathode seal degradation. While the exact mechanisms of seal degradation are not known with certainty, the general weakening of the seal caused by the electromigration of positive ions causes a reduction in the life and reliability of ring laser gyroscopes operated for long periods at elevated temperatures.

Degradation of ring laser gyroscope cathode seals by electromigration of positive ions is a phenomenon known in the art. For example, Karlbeinz vonBieren in U.S. Pat. No. 5,098,189, entitled "ION-SUPPRESSED RING LASER GYRO FRAMES", describes a similar problem. vonBieren teaches the use of specially formed gaps in the laser frame and/or auxiliary electrodes held in proximity to but not contacting the frame for the purpose of modifying the electric field in such a way as to suppress the flow of ions. Similarly, Canfield et. al., in U.S. Pat. No. 5,432,604, teach the use of specially placed insulating barriers to suppress ion transport in ring laser gyroscope frames.

While the air gap and insulating barrier methods taught in these two patents may be somewhat effective in their intended purposes, they have the disadvantage of increasing the number of precisely machined parts and complicating the gyro assembly process. Both of these disadvantages add cost and may act to reduce the reliability of the final instrument produced. The non-contacting auxiliary negative electrodes, taught by vonBieren, will probably not be effective since the desired electric field distortion thereby produced will quickly be canceled by an opposing electric field produced by positive ions attracted to the frame surface near the auxiliary electrodes. This field cancellation phenomenon, known as electrode polarization, is observed in ionically conducting systems in which one or both electrodes lack the ability to supply new ions to the ionically conducting medium or to absorb and neutralize the arriving transported ions. Thus, the non-contacting, negatively charged electrodes, taught by vonBieren, lack the ability to absorb and neutralize the attracted positive ions which will therefore accumulate producing a positive charge offsetting the negative charge on the electrode

SUMMARY OF THE INVENTION

The present invention addresses the problem of ion transport induced cathode seal degradation. Instead of attempting to suppress or block the flow of ions, as in the above referenced patents, this invention solves the ion migration problem by capturing the majority of the transported ions on a negatively charged trap electrode which is preferably applied in direct electrical contact with the gyro frame surface next to or surrounding the cathode seal. Since this trap electrode does not act simultaneously as a vacuum seal, the capture of electromigrated ions is accomplished with no detrimental effect on cathode seal life or reliability. The trap electrode material, dimensions and exact placement are not critical and its use adds very little cost and complexity to the ring laser gyroscope apparatus and construction process.

It is therefore an object of this invention to improve ring laser gyroscope cathode seal life and reliability by capturing electromigrated positive ions on a non-critical or sacrificial trap electrode, thereby neutralizing the detrimental effects of positive ions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

Figure 1:
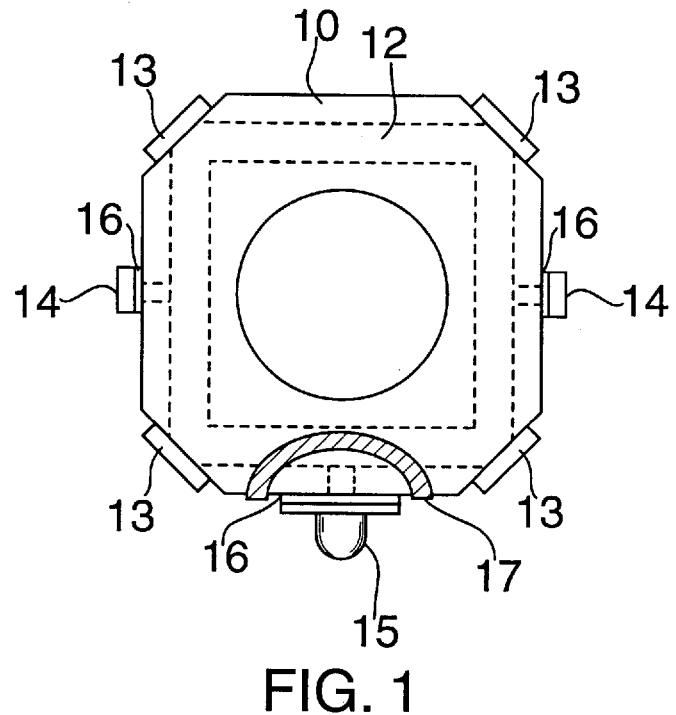
FIG. 1 is a plan view of gas ring laser assembly including the laser frame, laser bore, laser mirrors, anode and cathode electrodes, vacuum seals and an additional trap electrode ring surrounding the cathode electrode.

Referring to FIG. 1, a typical laser assembly for a ring laser gyroscope is built on a laser frame 10 within which are contained laser bores 12 which hold the helium neon lasing gas mixture and further define the closed laser path. The laser frame 10 is typically made from a low thermal expansion lithium aluminum silicate glass-ceramic such as the material known by the Trademark Zerodur. Such lithium aluminum silicate glass-ceramic materials typically exhibit ionic conductivity values higher than most other glass and ceramic materials. Attached to the outer surfaces of the laser frame are laser mirrors 13, anode electrodes 14 and a cathode electrode 15. Mirrors 13 are typically attached to the carefully polished corners of the frame by direct optical contacting. The anode 14 and cathode 15 electrodes are typically attached to the frame by means of indium vacuum seals 16. In addition to the components shown, the frame typically contains getter wells and getters to assure high purity in the lasing gas mixture and a centrally mounted mechanical flexure for the purpose of dithering the gyro to prevent laser mode locking at low rotation rates. Also not shown are mechanisms for moving one or more of the mirrors to maintain constant optical path length around the closed laser path. FIG. 1 is meant only to portray features of a typical ring laser design. Many variations are possible with respect to the number of mirrors, materials of construction, attachment methods etc. as is commonly known to those skilled in the art.

In this type of design, the negative electrical potential applied to the cathode electrode 15, which may be approximately −1000 volts, tends to attract mobile positive ions in the frame material which eventually deposit on the cathode vacuum seal 16 and degrade its properties. This problem is especially severe when the laser is operated in an elevated temperature environment which greatly increases the ionic conductivity of the lithium aluminum silicate glass-ceramic materials.

Figure 2:
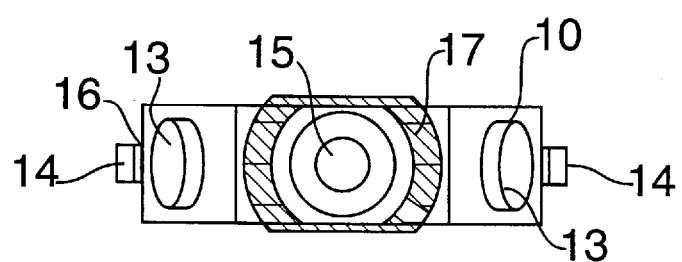
FIG. 2 is an elevation view of the embodiment of FIG. 1.

FIGS. 1 and 2 also show a trap electrode ring 17 placed in direct electrical contact with the frame surrounding the cathode electrode 15. In one preferred embodiment trap electrode 17 of FIG. 1 is made from a thin sheet of a metal-like copper and is attached to the frame outer surface in using a relatively compliant conducting adhesive. The words "conducting adhesive" are meant to indicate that the electrical conductivity of the adhesive is at least equal to or greater than the conductivity of the ionically conducting laser frame material 10. In other words, the adhesive should be sufficiently conductive so as not to pose a barrier to the ionic current arriving at the trap electrode 17. Suitable adhesives for this purpose include silver loaded compliant epoxies such as those supplied by A. I. Technology Inc (Princeton, N.J.) and designated ME8452, ME 8456 and LESP 8350. Alternatively, trap electrode 17 may be conductive paint applied to frame 10. Further, an electrode 17 comprising a thin sheet of metal attached to the frame 10 with a conducting adhesive can be made using aluminum foil tape (Scotch 1170) or copper foil tape (Scotch 1181), both products of the 3M Corporation. Preferably, trap electrode 17 is shaped in such a way so that it completely surrounds cathode electrode 15.

Alternatively, trap electrode 17 is a thin metal film applied by vacuum deposition. For example, trap electrode 17 could be made by evaporating or sputtering a film of aluminum onto the frame surface so that it preferably completely surrounds cathode 15.

Alternatively, trap electrode 17 is machined to the desired shape from a low thermal expansion metal alloy such as Invar or Super Invar and held in contact with the frame surface by purely mechanical means such as springs and clamps.

In a fourth preferred embodiment the trap electrodes are applied by brushing, wiping, spraying or silk screening a conductive ink or a conductive adhesive onto selected areas of the frame surface.

Preferably, the trap electrode 17 shown in FIG. 1 has a total area in contact with the laser frame which is comparable to the total area of the cathode vacuum seal. It is also preferable to set the electrical potential of the trap electrode 17 to a value more negative than the potential of the cathode.

Thus if the cathode voltage were −1000 volts, the trap electrode voltage should be set in the range of −1050 to −1200 volts. This will insure that the large majority of mobile ions are attracted to the trap electrode and not to the cathode vacuum seal 16.

Figure 3:
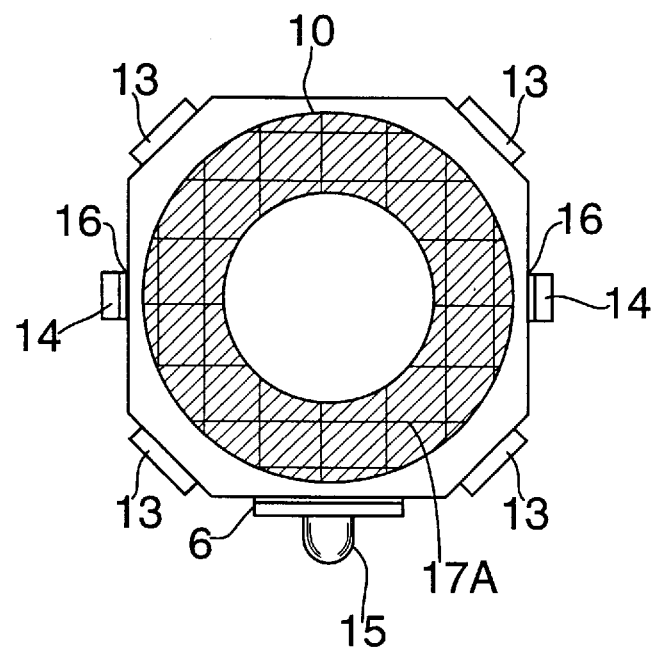
FIG. 3 is a plan view of an alternate embodiment of the invention having two trap electrodes attached to the opposing large external surfaces of the frame.
Figure 4:
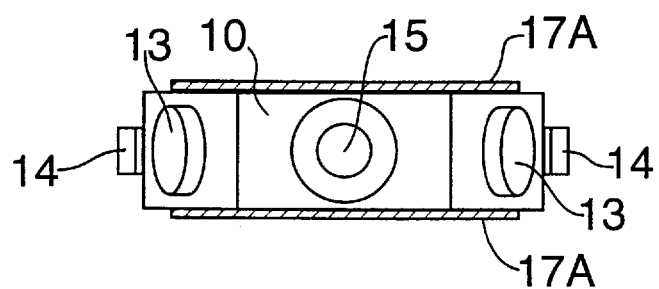
FIG. 4 is an elevation of the embodiment of FIG. 3.

FIGS. 3 and 4 illustrate an alternate embodiment of the invention. In this embodiment two trap electrodes 17A are attached to the large flat opposing faces of the laser frame 10. The symmetrical disposition of the two trap electrodes 17A is preferred to minimize twisting or bending loads transmitted to the laser frame due to differential thermal expansion. These twisting or bending loads may tend to misalign the laser resonator mirrors. In this embodiment the total area of the two trap electrodes 17A is substantially larger than the area of the cathode vacuum seal 16. The large area of the trap electrodes in FIG. 3 and 4 increases the effectiveness of the trap electrodes in capturing mobile ions. Trap electrodes 17A may be of the same materials and attached to the frame 10 as discussed above. The large electrode area, however, also increases the possibility of strains due to thermal expansion, which may tend to detrimentally increase or decrease the optical path length of the laser resonator. Such strains can be minimized by making the large trap electrodes 17A from woven or unwoven carbon fiber fabric attached to the faces of the frame 10 using one of the compliant, conducting adhesives mentioned above.

In all of the preferred embodiments it is important that the trap electrode 17, 17A are placed in electrical contact with the laser frame surface. It is also important that the trap electrode is constructed and attached to the frame in such a way as to minimize the transmission of detrimental mechanical forces to the laser frame. Finally, it is important that any residual mechanical forces transmitted to the frame are symmetrical and do not cause bending or twisting of the frame. Once these general requirements are met, the exact shape, material and mode of attachment of the trap electrodes are not critical.

It will be understood that the particular embodiments described above are only illustrative of the principles of the present invention, and that various modifications could be made by those skilled in the art without departing from the scope and spirit of the present invention, which is limited only by the claims that follow.

I claim:

1. A glass ceramic gas laser frame with anode and cathode electrodes positioned over openings through the surface of said frame for the purpose of exciting laser plasma within said frame and said electrodes electrically contacted to said frame by electrically conducting vacuum seals, said frame further comprising a negatively charged trap electrode placed in direct electrical contact with the surface of said frame.

2. The laser frame of claim 1 wherein said trap electrode is electrically coupled to a surface area of said frame that encircles said cathode.

3. The laser frame of claim 1 further comprising a plurality of negatively charged trap electrodes.

4. The gas laser frame of claim 1 wherein the voltage potential of said trap electrode is substantially equal to the voltage potential of said cathode electrode.

5. The gas laser frame of claim 1 wherein the voltage potential of said trap electrode is substantially more negative than the voltage potential of said cathode electrode.

6. The laser frame of claim 1 wherein the trap electrode is a metal element affixed to said frame with an electrically conducting adhesive.

7. The laser frame of claim 1 wherein the trap electrode is formed from a metal film applied to the frame by vapor or electrochemical means.

8. The laser frame of claim 1 wherein the trap electrode is a metal element held in contact with said frame by mechanical means.

9. A ring laser gyroscope having a frame formed of a material that includes mobile ions, an anode electrode and a cathode electrode and further comprising at least one trap electrode electrically coupled to said frame to attract migrating ions in said frame.

10. The ring laser gyroscope of claim 9 wherein the voltage potential of said trap electrode is substantially equal to the voltage potential of said cathode electrode.

11. The ring laser gyroscope of claim 9 wherein the voltage potential of said trap electrode is substantially more negative than the voltage potential of said cathode electrode.

12. The ring laser gyroscope of claim 9 wherein the trap electrode is a metal element affixed to said frame with an electrically conducting adhesive.

13. The ring laser gyroscope of claim 9 wherein the trap electrode is formed from a metal film applied to the frame by vapor or electrochemical means.

14. The ring laser gyroscope of claim 9 wherein the trap electrode is a metal element held in contact with said frame by mechanical means.

15. A glass ceramic gas laser frame formed of a material that includes mobile ions and having anode and cathode electrodes positioned over openings through the surface of said frame for the purpose of exciting laser plasma within said frame and with said electrodes electrically contacted to said frame by electrically conducting vacuum seals and a trap electrode placed in direct electrical contact with the surface of said frame to attract migrating ions in the frame.

* * * * *